United States Patent [19]
Ohtsuka

[11] Patent Number: 5,815,552
[45] Date of Patent: Sep. 29, 1998

[54] CALLING PARTY DESIGNATED MESSAGE DISPLAYING METHOD AND APPARATUS

[75] Inventor: Kiyokazu Ohtsuka, Tokyo, Japan

[73] Assignee: NEC Corporation, Tokyo, Japan

[21] Appl. No.: 594,785

[22] Filed: Jan. 31, 1996

[30] Foreign Application Priority Data

Feb. 13, 1995 [JP] Japan ................................... 7-024004

[51] Int. Cl.⁶ .................................................. H04M 1/64
[52] U.S. Cl. ........................... 379/88; 379/157; 379/165; 379/188
[58] Field of Search ................................. 379/67, 88, 89, 379/93, 96, 156, 157, 165, 188

[56] References Cited

U.S. PATENT DOCUMENTS

| | | | |
|---|---|---|---|
| 4,837,807 | 6/1989 | Szeto et al. ................................. | 379/96 |
| 5,434,910 | 7/1995 | Johnson et al. ............................ | 379/88 |
| 5,463,676 | 10/1995 | Ohsawa .................................... | 379/142 |

FOREIGN PATENT DOCUMENTS 1-220947 9/1989 Japan .
2-277361 11/1990 Japan .

*Primary Examiner*—Fan S. Tsang
*Attorney, Agent, or Firm*—Young & Thompson

[57] ABSTRACT

A communication system of the present invention includes an exchange connected to a plurality of subscriber terminals. The exchange includes a display data management section which includes first and second tables. The first table indicates types of messages and is used to refer to the second table. The second table stores data of display messages classified for individual message types and is retrieved with a message number. When a calling party depresses a message displaying function key and then depresses a message number on a subscriber terminal, the exchange recognizes that a message display request has been input. The exchange reads out data associated with the display message from the display data management section, and causes a terminal display section of the calling party terminal to display the data and further causes a terminal loudspeaker section to output speech to allow the calling party to confirm the display message. Thereafter, the designated message is displayed at the called party's subscriber terminal.

11 Claims, 3 Drawing Sheets

CALLING PARTY DESIGNATED MESSAGE DISPLAYING METHOD AND APPARATUS

BACKGROUND OF THE INVENTION

1. Field of the Invention

This invention relates to a method of and an apparatus for displaying a message to a subscriber terminal, and more particularly for allowing a calling party to cause a called party terminal to selectively display a message the calling party wants to have displayed.

2. Description of the Related Art

A calling party number identification function of a conventional exchange is a known fact. For example, a conventional exchange discriminates, for example, whether a terminating call terminates from within the exchange itself or from a central office or else from a private dedicated line, and changes the ringing sound on the subscriber terminal side so that the discrimination can be determined by the ringing sound. Also another method has been proposed wherein, as disclosed in Japanese Patent Laid-Open No. 277361/90, a calling party number is translated by a terminating side exchange so as to allow a called party terminal to display the source of the call.

In the conventional message displaying method described above, however, since it adopts the method wherein a calling party number is translated by the terminating exchange and a particular display message corresponding to a result of the translation is sent to the called party terminal, there is a disadvantage in that it is impossible for the called party terminal to display a display message a calling party wants to send.

SUMMARY OF THE INVENTION

It is an object of the present invention to provide a method and an apparatus by which, eliminating the drawback of the prior art described above, an calling party can select, from a subscriber terminal, a desired one of preset messages and cause the selected message to be displayed on a display section of the called party terminal.

In order to attain the object described above, according to an aspect of the present invention, there is provided a calling party designated message displaying method for an exchange system, which comprises the steps of registering a plurality of display messages in a corresponding relationship to respective message numbers in advance into an exchange, and then, upon communication, designating, by a calling party, a desired display message in the form of message number from one of a plurality of subscriber terminals, reading out, by the exchange, based on the message number inputted from the subscriber terminal, data of the designated display message from among the registered display messages and transmitting the read out data of the designated display message back to the calling party terminal to request confirmation of the read out display message, confirming the read out display message by the calling party in response to the request for confirmation, and thereafter designating and sending to the subscriber number of a called party terminal, call control information including the display message, and displaying, by the called party terminal, the designated display message based on the input data of the display message. The confirmation of the display message by the calling party on the calling party terminal described above is performed by displaying, based on the data of the received display message, the contents of the data of the display message, or further by performing, based on the received data of the display message, a speech synthesis of contents of the data of the display message so that the data of the display message is output as speech.

According to another aspect of the present invention, there is provided a calling party designated message displaying apparatus for an exchange system, which comprises, in each of a plurality of subscriber terminals, means for designating a desired display message in the form of a message number by a calling party, and means for receiving call control information including data of a display message designated by the calling party or another calling person and selected by an exchange and displaying the display message, and in the exchange, means for registering display messages in a corresponding relationship with message numbers, means for selecting, based on a message number designated from one of the subscriber terminals, data of a corresponding one of the display messages and transmitting the data of the display message as call control information to the calling terminal, known means for specifying a called party terminal in response to an operation of the calling party terminal as well as means for setting the data of the selected display message to the call control information to the specified called party terminal, and means for communicating, by a subscriber call controlling function and a repeating call controlling function, the call control information to the called party terminal. The calling party designated message displaying apparatus further comprises, in each of the subscriber terminals, means for converting, based on the data of the display message designated by the calling party and communicated from the exchange, contents of the data into speech and for outputting the speech.

In the present invention, if a calling party designates a message number of a display message to be displayed on a called party terminal and communicates the message number to the exchange, then the exchange retrieves the registered display messages therein and reads out and sends data of the designated display message back to the calling party terminal. The calling party terminal displays the display message based on the data. Further, the calling party terminal converts the contents of the display message into speech and outputs the speech. Consequently, the calling party can confirm the display message. Thereafter, the calling party will input a subscriber number of the called party terminal. The exchange receives the subscriber number and communicates the data of the designated display message together with call control information to the called party terminal. The called party terminal then displays the display message based on the data.

DETAILED DESCRIPTION OF THE PREFERRED EMBODIMENT

An embodiment of the present invention is described below with reference to the drawings.

Figure 1:
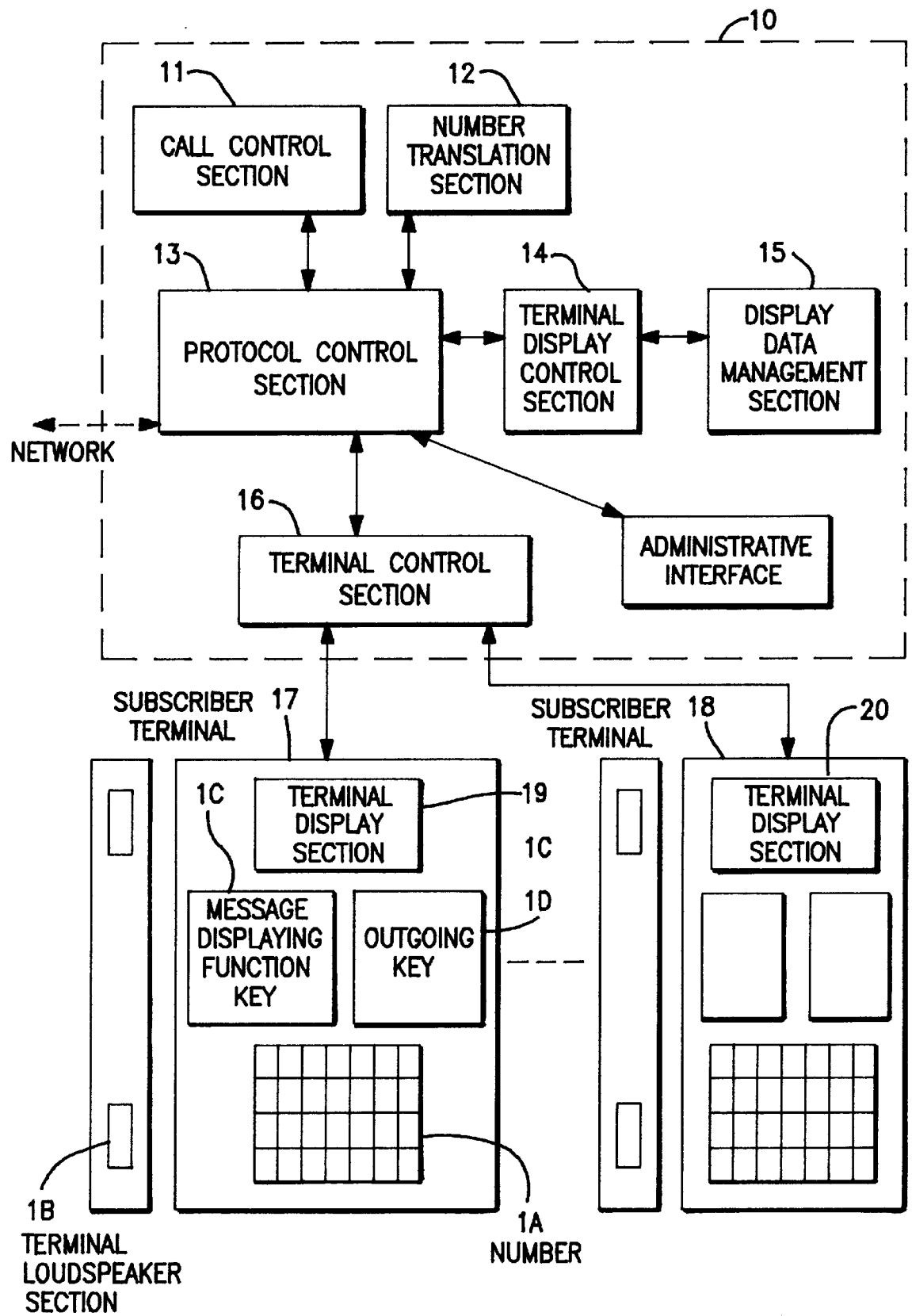
FIG. 1 is a block diagram showing the construction of a communication system which employs an embodiment of a calling party designated massage displaying method of the present invention.
Figure 2:
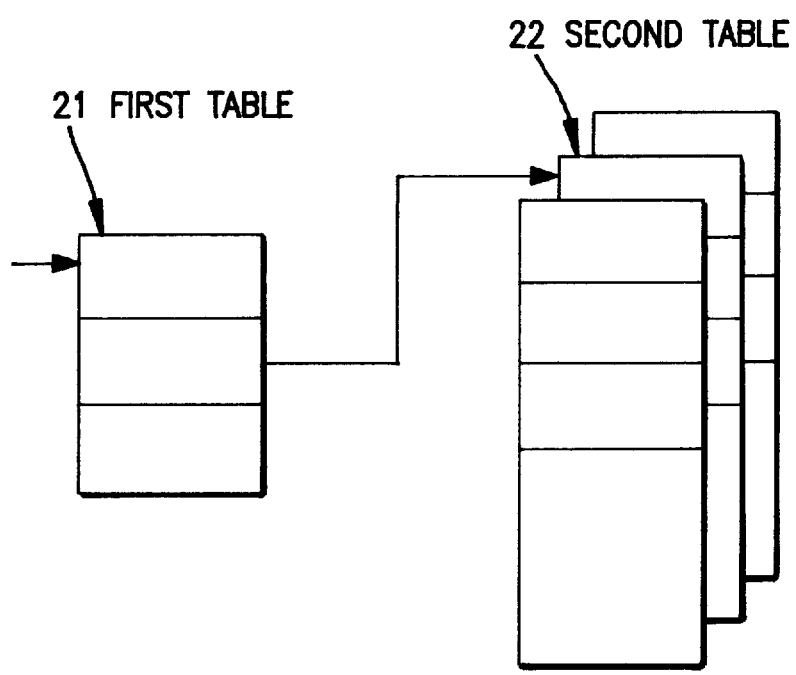
FIG. 2 is a diagrammatic view of the construction of data showing a message selection table provided in display data management section 15 of FIG. 1.

The communication system of FIG. 1 includes an exchange 10 which includes call control section 11, number translation section 12, terminal display control section 14, display data management section 15 and terminal control section 16, and protocol control section 13 which controls the components of the communication system. A plurality of subscriber terminals are connected to and accommodated in terminal control section 16. FIG. 2 shows the construction of data of display data management section 15 of FIG. 1. First table 21 is a table indicating types of messages and is used to refer to second table 22. Second table 22 stores data of display messages classified for the different types of messages and is retrieved with a message number to obtain information of a display message.

Figure 3:
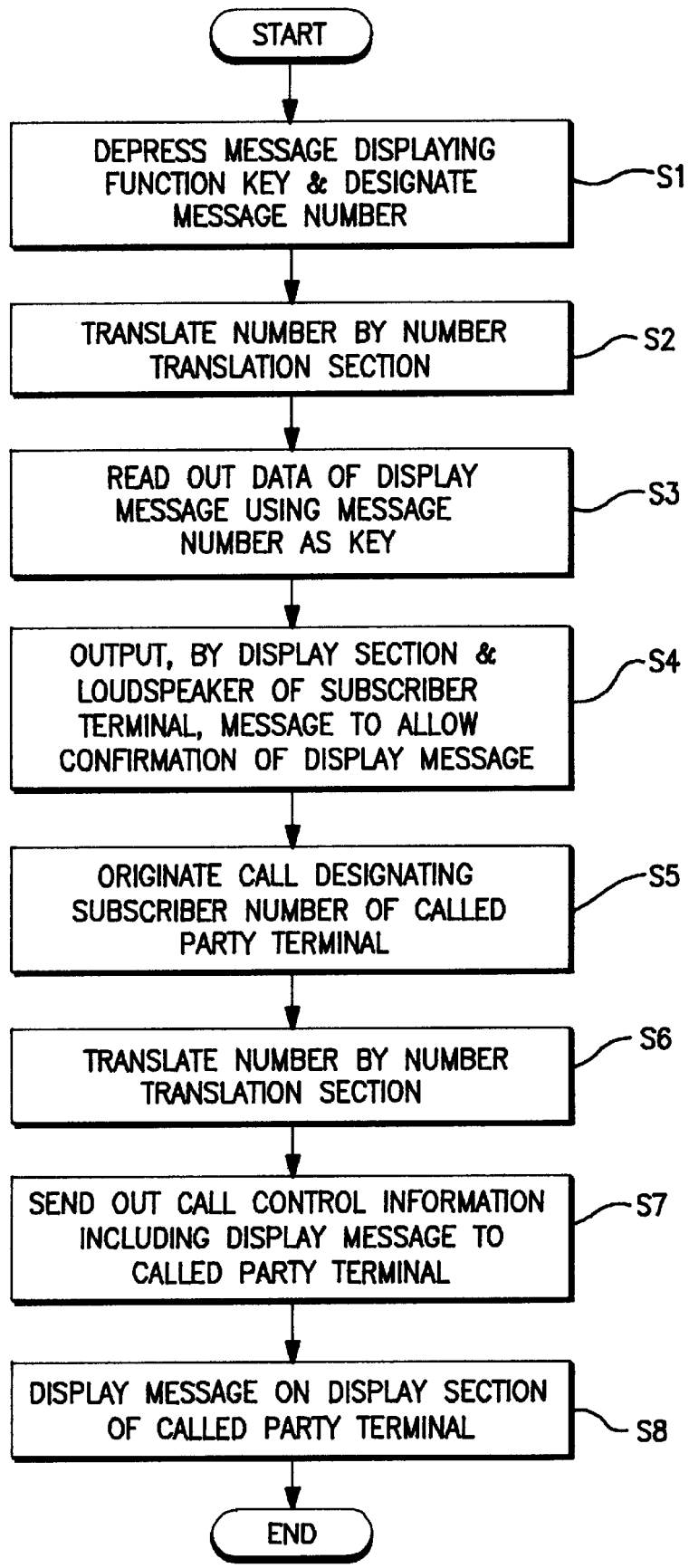
FIG. 3 is a flow chart illustrating displaying operation by the present embodiment.

Next, displaying operation by the present embodiment is described with reference to the flow chart of FIG. 3 by way of an example wherein subscriber terminals 17 and 18 serve as a calling party terminal and a called party terminal, respectively.

First, the calling party will depress message displaying function key 1C of subscriber terminal 17 and depress message number 1A (step S1). Protocol control section 13 recognizes the selection via terminal control section 16 and communicates call control information, including the contents of the selection, to number translation section 12. Number translation section 12 recognizes that the call control information includes a message displaying request, and communicates the message displaying request to protocol control section 13 (step S2). Protocol control section 13 requests, designating a message number to terminal equipment display control section 14, reading out of message data. Terminal display control section 14 reads out, based on the message number included in the request, data of a display message corresponding to the message number registered in advance from display data management section 15 and sends back the data to protocol control section 13 (step S3). Protocol control section 13 requests, designating the read out data of the display message, a message displaying request to subscriber terminal 17 via terminal control section 16. Subscriber terminal 17 displays, based on the received data of the display message, the contents of the data on terminal display section 19, and performs a speech synthesis with the data of the display message so that the data may be output as speech from terminal loudspeaker section 1B. The calling party will confirm contents of the speech (step S4). Thereafter, the calling party will designate a subscriber number of subscriber terminal 18 and depress outgoing key 1D (step S5). Terminal control section 16 communicates the number depressed to number translation section 12 via protocol control section 13. Number translation section 12 determines the terminal to be called by known means for calling a called party, and informs protocol control section 13 that the call should be sent to subscriber terminal 18 (step S6). Protocol control section 13 edits call control information including the data of the selected display message and communicates the result of the editing to call control section 11. Call control section 11 communicates a request for termination to subscriber terminal 18 to terminal control section 16 via protocol control section 13 by a known procedure. When terminal control section 16 recognizes that the data of the display message is included in the call control information, it terminates, designating the data of the display message, the call at subscriber terminal 18 by a known procedure and requests subscriber terminal 18 to display the message (step S7). Subscriber terminal 18 displays the message on terminal display section 20, based on the data of the designated display message (step S8).

As described above, according to the present invention, the exchange selects a display message to be displayed on a called party terminal based on a message number designated by a calling party using a calling party terminal, causes the calling party terminal to output the selected display message as a display and speech so that the display message may be confirmed by the calling party, and sends out the display message to the called party terminal. The called party terminal displays the received display message on the display section of the called party terminal itself. Consequently, the present invention is advantageous in that:

(1) the calling party can select a display message to be displayed on the called party terminal and cause the display message intended by the calling party to be displayed on the called party terminal;

(2) messages can be registered for individual languages which can be recognized by individuals as objects of display message notification so that a display message can be displayed using a language which can be recognized by a person to whom the display message is directed; and (3) the calling party can, before outgoing, confirm a display message to be displayed on the other party terminal as a display and speech.

What is claimed is:

1. A calling party designated message displaying method for an exchange system which includes a plurality of subscriber terminals and an exchange for controlling, based on call control information from one of said subscriber terminals or a network, a call to another one of said subscriber terminals or said network, comprising the steps of:

registering a plurality of display messages in a corresponding relationship to respective message numbers in advance into said exchange, and then, upon communication, designating, by a calling party, a desired display message in the form of message number from one of said subscriber terminals, reading out, by said exchange, based on the message number input from the subscriber terminal, data of the designated display message from among the registered display messages and transmitting the read out data of the designated display message back to the calling party terminal to request confirmation of the designated display message, confirming the designated display message by the calling party in response to the request for confirmation, designating and sending, after confirmation of contents of the designated display message by the calling party, the subscriber number of a called party terminal, communicating, by said exchange, call control information with the read out data of the designated display message to the designated called party terminal, and displaying, at the called party terminal, the designated display message based on the input data of the display message.

2. A calling party designated message displaying method as claimed in claim 1, wherein the confirmation of the designated display message by the calling party on the calling party terminal is performed by displaying, based on the data of the receiving of the designated display message, contents of the data of the designated display message.

3. A calling party designated message displaying method as claimed in claim 2, wherein the confirmation of the designated display message by the calling party on the calling party terminal is done further by performing, based on the received data of the designated display message, a speech synthesis of contents of the data of the designated display message so that the data of the designated display message is output as speech.

4. A calling party designated message displaying method as claimed in claim 1, wherein the step of registering display messages comprises the steps of registering the display messages in a first table by type of message and in second tables by message content, each one of the second tables being associated with a different type of message from the first table.

5. A calling party designated message displaying method as claimed in claim 4, wherein each type of message is a different language.

6. A calling party designated message displaying apparatus for an exchange system which includes a plurality of subscriber terminals and an exchange for controlling, based on call control information from one of said subscriber terminals or a network, a call to another one of said subscriber terminals or said network, comprising:

in each of said subscriber terminals, means for designating a desired display message in the form of a message number by a calling party, and means for receiving call control information after receiving of the message number, and means for displaying a received display message, and in said exchange, means of registering display messages in a corresponding relationship with message numbers, means for selecting, based on a message number designated from one of said subscriber terminals, data of a corresponding one of the registered display messages and transmitting the data of the selected display message to the calling terminal for confirmation, means for specifying a called party terminal in response to an operation of the calling party terminal, and means for communicating the call control information with the selected display message data to the called party terminal.

7. A calling party designated message displaying apparatus as claimed in claim 6, further comprising, in each of said subscriber terminals, means for converting, based on the data of the display message designated by the calling party and notified from said exchange, contents of the data into speech and outputting the speech.

8. A calling party designated message displaying apparatus as claimed in claim 6, wherein the means for registering display messages comprises a first table for registering display messages by type of message and plural second tables for registering display messages by message content, each one of the second tables being associated with a different type of message from the first table.

9. A calling party designated message displaying apparatus as claimed in claim 8, wherein each type of message is a different language.

10. A calling party designated message displaying method for a communication system having plural subscriber terminals and an exchange for controlling communication among the subscriber terminals, the method comprising the steps of:

storing in the exchange a plurality of display messages, the display messages being stored in a first table by type of message and in one of plural second tables by message content, each one of the second tables being associated with a different type of message from the first table;

communicating to the exchange from a calling one of the subscriber terminals one of the plurality of stored display messages which is to be communicated to a called one of the subscriber terminals;

providing from the exchange to the calling subscriber terminal the content of the designated display message for confirmation of the content thereof at the calling subscriber terminal;

confirming the content of the designated display message at the calling subscriber terminal; and communicating the confirmed designated display message from the exchange to the called subscriber terminal.

11. A calling party designated message displaying method as claimed in claim 10, wherein each type of message is a different language.

* * * * *